Figure 1:
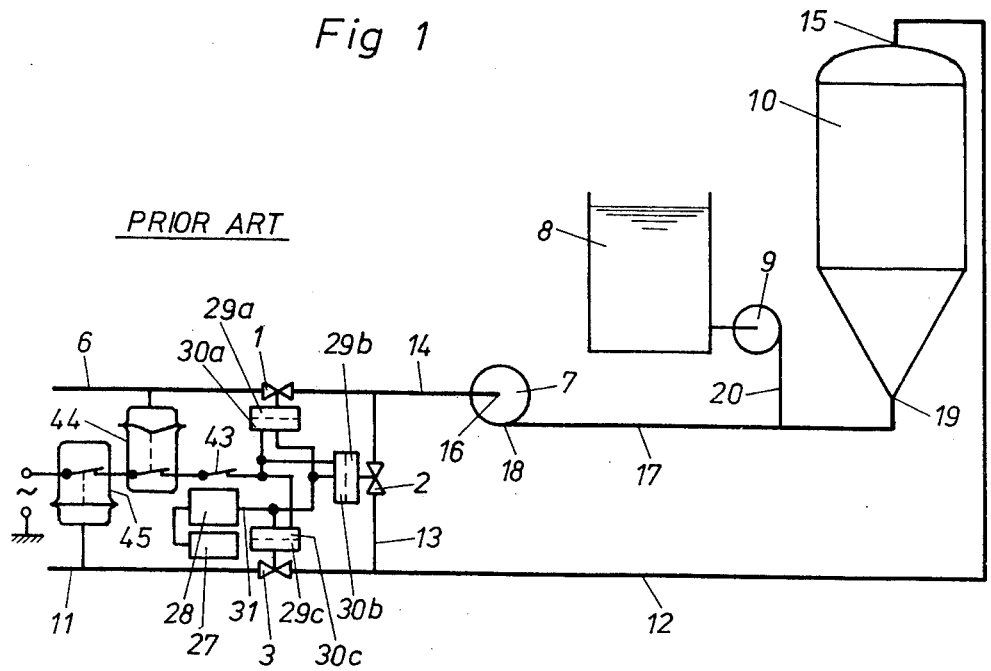

United States Patent [19]

Strub

[11] 4,081,376
[45] Mar. 28, 1978

[54] EMERGENCY RUNNING APPARATUS IN A FILTERING APPARATUS

[75] Inventor: Fritz Strub, St. Gallen, Switzerland

[73] Assignee: Filtrox Maschinenbau AG, St. Gallen, Switzerland

[21] Appl. No.: 703,653

[22] Filed: Jul. 8, 1976

[30] Foreign Application Priority Data

Jul. 11, 1975 Switzerland .................... 9073/75

[51] Int. Cl.$^2$ .............................................. B01D 35/14
[52] U.S. Cl. .................................. 210/143; 210/137; 210/196
[58] Field of Search ............... 210/98, 101, 137, 143, 210/196, 354, 416, 193, 323 T, 345

[56] References Cited

U.S. PATENT DOCUMENTS

| 183,424 | 10/1876 | Sinclaire | 210/137 |
|---|---|---|---|
| 665,606 | 1/1901 | Kennicott | 210/101 |
| 3,363,761 | 1/1968 | Groth et al. | 210/193 X |
| 3,405,058 | 10/1968 | Miller | 210/137 X |

FOREIGN PATENT DOCUMENTS 2,024,675  12/1971  Germany .................. 210/137

*Primary Examiner*—John Adee
*Attorney, Agent, or Firm*—William J. Daniel

[57] ABSTRACT

A settling layer filtration system having at least one settling layer arranged in a vertical direction with the liquid to be filtered being delivered thereto by means of an electric powered filter pump which is protected against the collapse of that settling layer in the event of the occurrence of an emergency condition which would interrupt the flow of liquid therethrough by the provision of an emergency standby operating means for maintaining during the emergency condition a minimum flow of liquid through said settling layer sufficient to maintain it in vertical working position. The emergency operating means includes a water turbine having a driving connection with pump means delivering liquid to the settling layer, means for sensing the occurrence of an emergency condition, and means operated in response to the sensing means for activating the water turbine to drive the pump to deliver liquid at a flow level at least sufficient to maintain the settling layer in its working orientation.

7 Claims, 4 Drawing Figures

EMERGENCY RUNNING APPARATUS IN A FILTERING APPARATUS

This invention relates to an emergency standby running unit for operating in the event of a breakdown caused by current supply failure in a filtering apparatus of the type which comprises an alluvial filter which is more commonly referred to in the filtration art as a settling layer filter and has vertical filter surfaces, and a filter pump, driven by an electric motor, for supplying liquid to be filtered to the filter inlet duct. The filtering apparatus is adapted to be set on the one hand for normal filtering operation, in which the liquid passing from a raw liquid supply duct through the filtering apparatus to a filtrate discharge duct, and on the other hand, for purposes of deposition of the settling layer or when breakdowns or irregular operating conditions occur, more particularly in the case of blockage of the unfiltered liquid supply duct and/or the filtrate discharge duct, for pump-driven liquid circulation, in which the liquid within the filtering apparatus is recycled through the settling layer filter again and again.

Known emergency standby units for apparatus of this kind are all based on the principle of providing, during electrical power supply failures, a suitable substitute current source which then takes the place of the normal electric current supply and takes over the function of supplying current for driving the filter pump, electric motor at, if need be a relatively small pump output which is sufficient to maintain a liquid circulation within the filtering apparatus.

Since electric motors driving the filter pump during normal operation are usually three-phase motors, either the substitute current source had to supply three-phase current or else, if a direct current source was used as the substitute current source, an additional direct current motor had to be provided for driving the filter pump during emergency operation.

An emergency electric generator is the only substitute current source for supplying three-phase current that can be used in practice. But apart from the fact that many filtering plants do not have an emergency electric generator of their own at all, the usual emergency generators driven by internal combustion engines are unsuitable for the present purpose, because a certain time is necessary for starting the internal combustion engine after the moment at which the current supply fails, and this period of time is too long to maintain the settling filter in a working condition.

In settling layer filters with vertically extending settling layers, which at present are usually employed, mostly in the form of so-called candle filters, because of their advantages in design and operation as compared with settling layer filters having horizontal settling layers, essentially uninterrupted contact pressure of the deposited layers against the underlying vertical supporting surfaces is necessary in order to prevent the deposited layers from collapsing, i.e., sliding off the supporting surfaces. For this contact pressure of the deposited layers against their supporting surfaces to be maintained, it is necessary to have a practically uninterrupted liquid pressure on the deposited layers and consequently, therefore, a continuous liquid flow through the settling layer. If this flow ceases, for instance because the filter pump stops as a result of current supply failure, then the deposited layers begin to slide down the vertically arranged supporting surfaces, by reason of gravitational force acting on these layers. In the absence of pressure biasing the deposited layer against the supporting surface, frictional forces between the deposited layer and the supporting surface, which would prevent the layers from sliding down in this way, are no longer present. Even if the flow recommences before the layers have collapsed completely, an upper part of the supporting surface is exposed, and this results at least in a substantial impairment of the filtering efficiency of the filter, and often even in a still more serious blocking phenomena in this upper region of the supporting surface. In order to avoid this, after stoppage of the flow the filtration cycle must be broken off and a fresh settling layer deposited on the support, unless the stoppage is limited to a very short period of time (during which no exposure of supporting surface regions can occur). With emergency generators driven by internal combustion engines, the period of time for activating the generator, more particularly for starting the internal combustion engine, may become greater than this short period of time during which stoppage of the flow through the filter still has no disadvantageous consequences, and therefore the use of an emergency generator driven by an internal combustion engine is not possible for the present purpose, even if such generator is available.

Therefore, the only substitute current source of three-phase electric current that could be used would be an emergency generator consisting of a D.C. accumulator and a direct current to three-phase current converter, because this unit would be able to supply three-phase current to the three-phase motor driving the filter pump, practically immediately after a current supply failure.

However, the technical outlay for an emergency generating unit of this kind, which has the capability of supplying three-phase current immediately after a current supply failure, is greater than the outlay for a standby direct current motor which is coupled with the pump but can take over the function of driving the filter pump during emergency conditions, together with an accumulator for supplying direct current to this motor. Therefore, the latter solution is generally preferred.

In either of the above solutions, however, an accumulator is necessary, which requires not only a relatively high installation cost not only for the accumulator itself but also for a separate accumulator room, but also a considerable expenditure for ensuring that the accumulator is always ready for operation. Moreover, the accumulator has a limited life at best because it is used only occasionally in the case of current supply failure.

Considering the abovementioned requirement that the liquid flow through the filter layer must be practically uninterrupted, any other possible emergency operating system would require an energy storage device which at the moment of current failure can make available the necessary energy for maintaining the flow through the filter. Consequently, it is possible to dispense with an accumulator only if some other energy storage device is used which involves its own specific problems and disadvantages, and therefore an accumulator has generally been thought practically indispensable in the known emergency operating unit of the kind in question.

The present invention is based on the problem of providing an emergency operating unit of the kind in question which avoids the need for any type of energy storage device so that the cost for installation and maintenance inherent in an energy storage device and thus the total technical outlay for the emergency operating unit can be substantially reduced.

According to the invention this is achieved by an emergency operating unit for a settling layer filter system, which is characterised by a water turbine for driving the liquid circulation pump, and an automatically operating switching means for converting the system from a normal throughput operating condition to recirculation condition and for turning on a supply of water from an available water supply system to the water turbine in the case of current failure.

Compared with the known energy operating units of the kind mentioned above the present emergency running apparatus has the substantial advantage that an available water supply system serves in effect as an energy storage means, and therefore the previously required outlay for the installation and maintenance of the accumulator provided for this purpose, is dispensed entirely with. A further advantage is that the technical outlay for the water turbine is less than the technical outlay previously necessary for a direct current motor or a direct current to three-phase current converter.

In a preferred embodiment of the present emergency operating unit the water turbine drives the supply pump for the liquid to be filtered and the conversion from normal throughput to emergency recirculation condition the switching device connects the settling layer outlet to the supply pump inlet and closes the unfiltered liquid supply line upstream of the pump inlet and the filtrates outlet line leading from the filtering apparatus. In this arrangement, the driving shaft of the filter pump may be coupled to the driven shaft of the water turbine, preferably in such a manner that one end of the driven shaft of the water turbine is coupled to the driving shaft of the filter pump and the other end to the electric motor normally driving the liquid supply pump.

By reason of the fact that in this instance the supply pump is used both for normal operation and emergency operation, and the pump output for emergency operation need amount to only a fraction of its output in normal operation, this preferred embodiment requires that during emergency operation the supply pump be driven at a relatively low speed but still with relatively high torque, which in practice requires a water turbine that is relatively large spatially. While this case, therefore, has the advantage that the same pump is used for normal operation and for emergency operation, it has the disadvantage of requiring a relatively large sized water turbine.

If this much space is not available in the area adjacent the supply pump, to which the water turbine is to be coupled in the abovementioned preferred embodiment, or if the utilization of the filter pump for emergency operation is undesirable for other reasons, then in an alternative embodiment a separate pump may advantageously be provided for liquid recirculation during emergency operation, and this additional pump is powered by the water turbine. In this instance, for conversion from normal throughput to liquid recirculation condition the switching device connects a recirculation conduit between the additional pump and the settling layer filter system, while closing the unfiltered material supply line and the filtrate outlet line leading from the filtering system. In this case the additional pump and the water turbine can be adjusted to provide the pump output capacity desirable for emergency running operation, that is to say the rated speed of the water turbine for this pump output can be made relatively large and therefore the space required for the water turbine and the additional pump can be made correspondingly small.

The present emergency running apparatus may with particular advantage be provided in a filtering system which in order to facilitate conversion is equipped with appropriate shut-off valve in the supplin line and in the filtrate outlet line, and with a communicating line including a shut-off valve device, between the filter outlet and the supply pump inlet plus an electromechanical or electro-pneumatic control device for actuating the closure or shut-off valves. The control device may advantageously be adapted to actuate at least one further closure device located in the water supply line leading to the water turbine, and the combination of the control device and the shut-off valves which it actuates may constitute the abovementioned switching means. The additional cost for installing the present emergency operating unit in a filtering system of this kind is thus limited to the water turbine plus in some cases an additional pump, whereas for the switching device practically no additional outlet is necessary, because an existing control device can usually be used for this switching device.

In the present emergency operating unit the water supply is preferably taken from a public or private water main. In this case the water leaving the water turbine may advantageously be taken to a collecting container for further use.

Figure 1A:
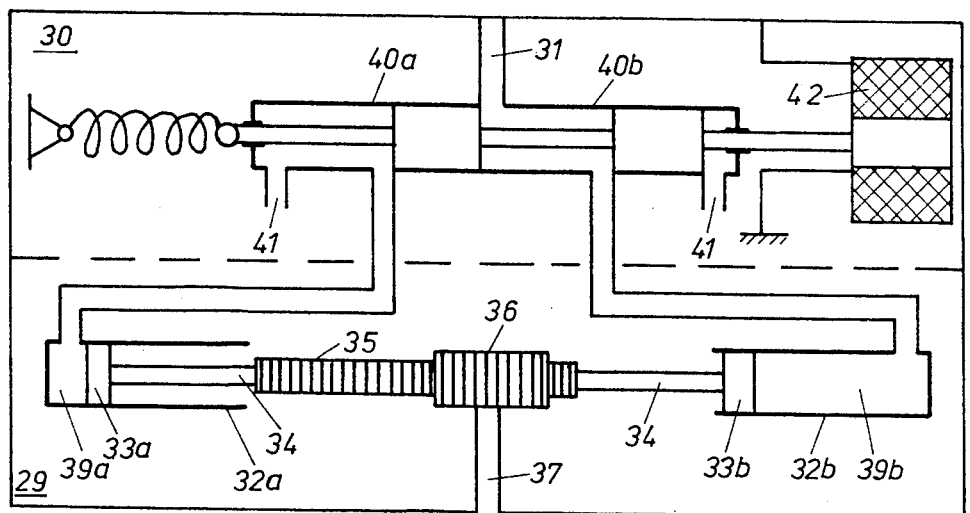
Figure 2:
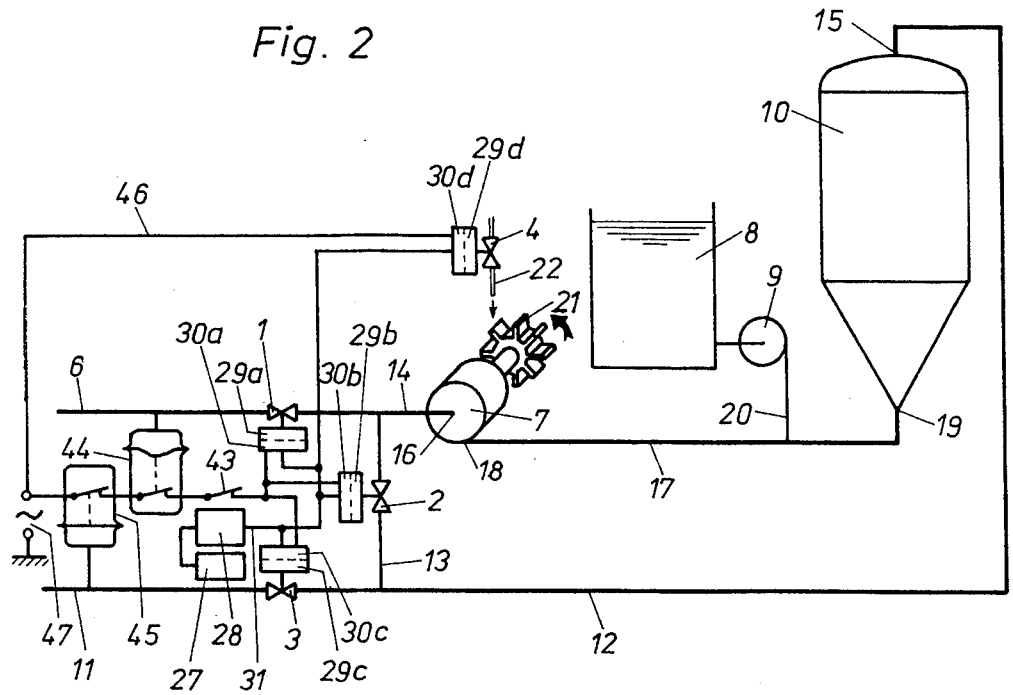
Figure 3:
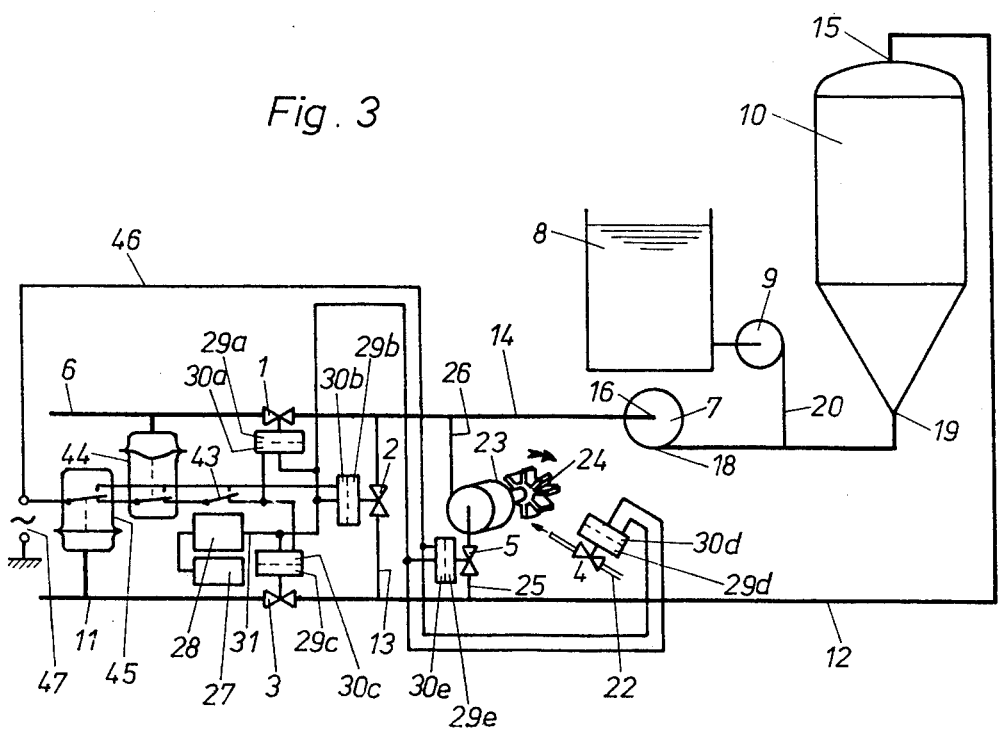

Some embodiments of the invention are described in detail with reference to the following Figures. In these, FIG. 1 and 1a shows a known filtering apparatus with a candle filter and a filter pump driven by an electric motor and with shut-off valves in the raw liquid supply duct and the filtrate discharge duct and a communicating duct leading from the candle filter outlet to the filter pump through a shut-off valve;

FIG. 2 shows a filtering apparatus as in FIG. 1, which is provided with a preferred embodiment of the present emergency operating unit; and FIG. 3 shows a filtering apparatus as in FIG. 1, which is provided with an alternative embodiment of the present apparatus having an additional pump.

The known filtering apparatus illustrated in the form of a block diagram in FIG. 1 comprises a shut-off valve in the raw liquid supply duct 6, 14, a filter pump 7 driven by electric motor, e.g., a three-phase electric motor, not shown in the drawing, a connecting line 17 between the pump outlet and the inlet 19 of a filter container 10, a kieselguhr supply apparatus, comprising a kieselguhr container 8 and a diaphragm pump 9, for forming in a preparatory stage before actual filtration a kieselguhr suspension which upon its passage via a line 20 through the filter container 10 builds up the settling layer by deposition of the kieselguhr in situ upon the candle surface therewith, a shut-off valve 3 in the filtrate outlet duct 11, 12, a by-pass line 13 between the section 12 of the outlet line upstream of valve 3 and the section 14 of the supply line downstream of valve 1, the line 13 including a shut-off valve 2 therein, an electro-pneumatic control device 27–42, for the shut-off valves 1, 2 and 3 and various switching members 43–45, also not shown in the drawing, for activating this control device 27–42.

The control device for the shut-off valves 1, 2 and 3 comprises a compressor 27, a compressed air storage or accumulator means 28 connected to the compressor 27, a pneumatic actuating device 29a–29c for each of the valves 1, 2 and 3, an electromagnet servo or control valve 30a–30c associated on each changeover device 29a–29c, for controlling each valve and a communication duct 31 between the compressed air storage means 28 and each electromagnet control valve 30a–30c. Each pneumatic changeover device 29 comprises two coaxially arranged double-acting pressure cylinders 32a, 32b of which the plumgers 33a, 33b are interconnected by a common plunger rod 34. The common plunger rod 34 carries, in its central region between the two pressure cylinders 32a, 32b, a rack 35 which acts, through the intermediary of a pinion 36, on the pivot shaft 37 of the associated shut-off valve. The shut-off valves 1, 2 and 3 are either ordinary stock-cock valves which by rotation of the stem can be changed over from open to closed position by rotation through 90°, or are what are known as flap valves with a valve flap mounted on the pivot shaft which can also be changed over from the open to closed position by rotation through 90°. The respective working chambers 39a, 39b of the two pressure cylinders 32a, 32b each are connected to an associated two-way electromagnet which either connects the compressed air supply to the cylinder interior or exhausts the same to the atmosphere 41, and the two two-way valves 40a, 40b are coupled together for alternating operation, i.e., so that when one 40b is set to supply compressed air, the other 40a is set to exhaust to the atmosphere. Both two-way valves 40a, 40b are actuated as a unit by an electromagnet 42, e.g., solenoid, which when actuated effects communication of the working chamber 49b of a first pressure cylinder 32b with the compressed air storage device and communication of the working chamber of the second pressure cylinder 32a with the atmosphere 41, and, conversely, when current is not supplied, effects communication of the working chamber 39b of the first pressure cylinder 32b with the atmosphere 41 and communication of the working chamber 39a of the second pressure cylinder 32a with the compressed air storage device 26, the shut-off valves 1, 2 and 3 being opened and closed accordingly. The electromagnet control valves 30a–30c associated with the individual shut-off valves 1, 2 and 3 are so connected that when current is supplied thereto, the shut-off valves 1 and 3 are set in the open position and shut-of valve 2 is set in the closed position, and vice versa when current is cut off.

The switching members for this electromagnetic valve control 27–42 comprising firstly a manual switch 43 in the current supply line to the electromagnetic valves 30a–30c, by which the current supply to the electromagnetic valves can be intentionally switched off for deposition of the settling layers and switched on during filtering operation, and secondly a pressure switch 44, 45 connected to each of the raw liquid supply duct 6 and the filtrate discharge duct 11; which, when the pressure in the unfiltered material supply duct 6 falls below a specified permissible minimum pressure, or when the pressure in the filtrate discharge duct 11 rises above a specified permissible maximum pressure, shuts off the current supply to the electromagnet valves 30a–30c and thereby converts the system to a recirculation condition. All three of these switches 43–45 are connected in series, so that in its switched off position each of the three switches 43–45 interrupts the current supply to the electromagnetic valves 30a–30c and thereby converts the system to recirculation.

Now, FIG. 2 shows how the filtering apparatus diagrammatically illustrated in FIG. 1 can be provided with the present emergency operating unit. For this purpose, as shown in FIG. 2, in principle it is only necessary to couple the water turbine 21 to the shaft of the filter pump 7 and to connect the supply duct 22, leading to the water turbine 21, to an available water main by way of shut-off valve 4. In this case the valve 4 is actuated by a pneumatic changeover device 29 and an electromagnetic valve (not shown), in the same way as the shut-off valves 1, 2 and 3 and the pneumatic changeover device 29d and the electromagnetic control or servo valve 30a may advantageously be constructed and connected to the shut-off valve 4 in exactly the same way as with shut-off valve 2. That is to say, when current is supplied to the solenoid arranged within the servo valve 30d the shut-off valve 4 is closed, and if the current supply fails it is opened. The pneumatic changeover device 29d provided for the shut-off valve 4, and the associated electromagnetic control or servo valve 30d, may advantageously be included in the overall control device. But in this case the current supply to the electromagnet control valve 30d for shutoff valve device 4 is to be connected to the electrical current source, which consists for instance of the secondary side of a transformer connected to the current supply system before, i.e., upstream of, the above identified switches, so that the electromagnet control valve 30d for shut-off valve 4 is connected to this current source directly, while the electromagnet valves 30a–30c of the shut-off valves 1, 2 and 3 are connected to this source through the three switches 43–45 connected in series.

In the case of current supply failure, the control device then automatically closes the shut-off valves 1 and 3 and opens the shut-off valves 2 and 4, whereby the water turbine 21 is set in operation and a changeover to liquid recirculation within the filtering system is effected. The water turbine 21 then drives the filter pump 7, whereby a liquid is recirculated through the settling filter 10 by filter pump 7 and via lines 12, 13, 14 and 17 and the now opened shut-off valve 2.

The water turbine 21 is preferably a light Pelton turbine which can be made very simply and cheaply. The pump output necessary to prevent the deposited layer from sliding or collapsing off its supporting surfaces is very much less than that for normal filtering operation (for instance only about 10% of the pump output during normal filtering operation), so that the rated output of the water turbine 21 and therefore of course its water consumption per unit of time can be kept relatively small. In the case of the embodiment shown in FIG. 2, in which the water turbine 21 acts directly on the filter pump shaft, the water turbine must provide this rated output at a relatively small speed of rotation (i.e., substantially smaller than the speed of rotation of the filter pump during normal filtering operation) and with medium output torque, which requires a relatively large sized water turbine 21.

Under certain circumstances it may therefore be of advantage to use a separate small pump instead of the filter pump itself for maintaining the liquid circulation for emergency operation. In this way optimum combination of water turbine and liquid pump can be selected and then it is possible to operate the water turbine with higher speeds of rotation and a lower output torque.

An example of this modification is shown in FIG. 3. In this case the filtering apparatus is again the same as described above with reference to FIG. 1, except for the following differences. First, in the control device thereof the pneumatic changeover device 29b associated with the shut-off valve 2 is so connected that when current is supplied to the associated electromagnetic servo valve 30b the shut-off valve 2 is opened and in the absence of the current supply this device is closed. The switches 43-45 for activating the control devices are not formed as simple on-off switches but as double-throw switches having their switching paths connected in series so that when in their normal operating positions, i.e., where the filtering operation is proceeding normally with a pressure above the permissible minimum pressure in the unfiltered material supply duct 6 and with a pressure below the permissible maximum pressure in the filtrate discharge duct 11, the electromagnet servo valves 30a, 30c for shut-off valves 1 and 3 are connected to the current source to maintain such valves open, and when in their emergency switching positions the electromagnet servo valve 30b for the shut-off valve 2. Thus, when any one of the three double-throw switches 43-45 is switched over into its emergency switching position, it interrupts the current supply to the electromagnet valves 30a, 30c for shut-off valves 1 and 3 (whereby the shut-off valves 1 and 3 are closed) and connects the current supply to the electromagnet valve 30b for shut-off valve 2 (whereby the shut-off valve 2 is opened) which converts the system from normal liquid throughput to liquid recirculation therewithin.

In the embodiment in FIG. 3 the emergency operating unit comprises the turbine and pump unit comprising the small separate liquid pump 23 and a water turbine 24 having its torque and speed adjusted to this pump, the shut-off valves 4 and 5, the supply duct 22 between the water turbine 24 and the water main and including a shut-off valve 4, and a by-pass line duct 25, 26 by which the outlet of the small pump 23 is connected to the filter inlet line section 14 and the inlet of this pump is connected by way of the shut-off valve 12 to the outlet line 12, upstream of shut-off valve 3 and a pneumatic changeover device 29d, 29e and associated electromagnet servo valve 30d, 30e is provided for each of the shut-off valves 4 and 5.

The pneumatic changeover devices 29d, 29e and electromagnet servo valves 30d, 30e for the shut-off valves 4 and 5 may advantageously be formed in the same way as with shut-off valves 1 to 3, except that the changeover devices 29d, 29e for shut-off valves 4 and 5 are so connected to the associated electromagnet valves 30d, 30e that when current is supplied to the associated electromagnet valves 30d, 30e the shut-off valves 4 and 5 are closed and if the current supply fails these valves are opened, whereas in contradistinction to this the pneumatic changeover devices for shut-off valves 1 to 3 are so connected to the associated electromagnet valves that each of the latter shut-off valves is opened when current is supplied and closed if current is absent.

The pneumatic changeover devices 29d, 29e for shut-off vaves 4 and 5, and the associated electromagnet valves 30d, 30e, may advantageously be included in a common control device, as in the embodiment in FIG. 2. In this case also the electromagnet valves 30d, 30e associated with the two shut-off valves 4 and 5 may be connected to the current supply directly, that is to say in absence of the previously mentioned switching members 43-45, which supply can as before consist for instance of the secondary side of a transformer connected to the main current supply system, while the electromagnet valves 30a-30c of the shut-off valves 1, 2 and 3 are connected to this source 47 by way of the above-mentioned three double-throw switches 43-45.

In case of current supply failure the control device then automatically closes the shut-off valves 1, 2 and 3 (or leaves them in the closed state if they are already closed) and opens the shut-off valves 4 and 5, whereby the water turbine 24 is set in operation and the system is converted to effect liquid recirculation.

In this case the water turbine 24 may be a light Pelton turbine as in the embodiment in FIG. 2. The separate pump 23 may advantageously be a small centrifugal pump. If the separate pump 23 is suitably dimensioned, the speed of rotation of the water turbine 24 may amount for instance to three times the speed of rotation of the water turbine 21 in the embodiment of FIG. 2, and the output torque of the water turbine 24 may be correspondingly reduced to a third of the output torque of the water turbine 21.

Finally it should be noted that the present emergency operating unit is intended primarily for filtering systems by which relatively valuable liquids such as wine, spirits, beer and the like are filtered, in which case dilution of the liquid to be filtered with water cannot be tolerated or is undesirable; in filtering systems for raw liquids which can be diluted with water without disadvantages, if the current supply should fail, water from the water main could of course be allowed to flow directly through the settling filter. The latter approach is not feasible in the filtration of relatively costly liquids because it would result in practice in the loss of a large part of the liquid being filtered.

I claim:

1. In a settling layer filtration system including a settling filter having at least one settling layer arranged in a vertical direction wherein the liquid to be filtered is fed through said settling layer by means of an electric powered filter pump, in combination, the improvement of an emergency standby operating means for maintaining in the event of the occurrence of an electric current failure a minimum flow of liquid through said settling filter which is sufficient to maintain said settling layer in vertical working position, said emergency operating means comprising a water turbine having a driving connection with said pump for feeding liquid through said settling filter, means for sensing the occurrence of said current failure, an available source of water under pressure, and means operated in response to said sensing means for connecting said water turbine to said water source to drive said pump to feed said liquid at a flow level at least sufficient to maintain said settling layer in its working orientation.

2. The system of claim 1 wherein said pump means comprises said filter pump itself and said water powered turbine includes a driving shaft coupled to said filter pump.

3. The system of claim 1 including means forming a normally closed recirculation circuit between the outlet and inlet of said settling filter and including said pump means, normally open shut-off valve means in the inlet line and outlet line to and from said settling filter, said shut-off valve means being respectively situated upstream and downstream of said recirculating conduit means, and operating means for opening said normally closed recirculating conduit means and closing said normally open shut-off valve means, said sensing means comprising electrically activated control means for said operating means.

4. The system of claim 3 wherein said recirculating conduit means includes a separate pump from said filter pump, said separate pump constituting said pump means.

5. The system of claim 3, wherein said pump means comprises the filter pump itself, and said recirculation circuit forming means includes conduit means connecting between said settling filter outlet and the filter pump inlet and normally closed valve means in said conduit, and including operating means for opening said last-mentioned valve means, said sensing means comprising electrically activated control means for said operating means.

6. The system of claim 3, wherein said recirculation circuit forming means includes conduit means connecting between said settling filter outlet and inlet, a separate pump from said filter pump forming a part of said conduit means, which separate pump comprises the pump means, and a normally closed valve in said conduit means upstream from said separate pump inlet, and including operating means for said last-mentioned valve means, said sensing means comprising electrically activated control means for said operating means.

7. The system of claim 1, wherein the water from said available source which passes through said turbine is collected for subsequent re-use.

* * * * *